US012781673B2

(12) United States Patent
Wang et al.

(10) Patent No.: US 12,781,673 B2
(45) Date of Patent: Nov. 3, 2026

(54) GAS FUEL FLOW CONTROL MECHANISM OF ELECTRONIC CONTROL SYSTEM

(71) Applicant: Qi'an Chen, Rui'an (CN)

(72) Inventors: Xuesheng Wang, Rui'an (CN); Qi'an Chen, Rui'an (CN)

(73) Assignee: Qi'an Chen, Rui'an (CN)

( * ) Notice: Subject to any disclaimer, the term of this patent is extended or adjusted under 35 U.S.C. 154(b) by 128 days.

(21) Appl. No.: 18/928,437

(22) Filed: Oct. 28, 2024

(65) Prior Publication Data

US 2026/0117715 A1 Apr. 30, 2026

(51) Int. Cl.

*F02D 9/10* (2006.01)
*F02D 9/02* (2006.01)

(52) U.S. Cl.

CPC ............. *F02D 9/1065* (2013.01); *F02D 9/02* (2013.01); *F02D 9/1005* (2013.01); *F02D 9/105* (2013.01)

(58) Field of Classification Search

CPC ........ F02D 9/08–18; F02D 9/109; F02D 9/02; F02D 9/105; Y10T 137/87676; Y10T 137/87684
USPC .................................................. 137/605, 606
See application file for complete search history.

(56) References Cited

U.S. PATENT DOCUMENTS

| | | | | |
|---|---|---|---|---|
| 4,635,609 A * | 1/1987 | Seppen | F02M 26/19 | 123/527 |
| 5,297,522 A * | 3/1994 | Buchl | F02D 11/107 | 123/399 |
| 8,807,158 B2 * | 8/2014 | Harris | B01F 35/56 | 285/294.1 |
| 10,641,406 B2 * | 5/2020 | Rosaen | B60K 11/02 | |
| 11,555,638 B2 * | 1/2023 | Rosaen | F04F 3/00 | |
| 12,473,866 B2 * | 11/2025 | Gagnon | B01F 25/312531 | |
| 2006/0005808 A1 * | 1/2006 | Blomenberg | F02D 9/1065 | 123/399 |
| 2009/0007884 A1 * | 1/2009 | Bunne | B62K 23/04 | 180/219 |
| 2010/0256890 A1 * | 10/2010 | Baldauf | F02D 41/1497 | 701/102 |
| 2014/0261311 A1 * | 9/2014 | Bayer | F02M 21/023 | 123/336 |
| 2020/0102915 A1 * | 4/2020 | Manhart | F02M 1/02 | |

(Continued)

FOREIGN PATENT DOCUMENTS

CN 110529262 A * 12/2019 .............. F02D 11/10

OTHER PUBLICATIONS

Translation of CN 110529262 A (Year: 2019).*

*Primary Examiner* — William M Mccalister
(74) *Attorney, Agent, or Firm* — Westbridge IP LLC

(57) ABSTRACT

A gas fuel flow control mechanism of an electronic control system includes a body, where a fuel gas inlet, an air inlet and a gas mixture outlet are provided on the body, the fuel gas inlet and air inlet are communicated with the gas mixture outlet through a main channel, a throttle with controllable opening is provided in the main channel near the gas mixture outlet, a valve plate with controllable opening is provided in the fuel gas inlet, the valve plate is rotatably connected with the body through a rotating shaft, and both ends of the rotating shaft are respectively provided with a motor and an angle sensor, a shaft sleeve in fit with the rotating shaft is provided in the angle sensor, the shaft sleeve has a shaft hole into which the rotating shaft is inserted and mounted.

7 Claims, 11 Drawing Sheets

(56) References Cited

U.S. PATENT DOCUMENTS

| | | | | |
|---|---|---|---|---|
| 2022/0099049 | A1* | 3/2022 | Walser | F02M 21/0239 |
| 2023/0235706 | A1* | 7/2023 | Gagnon | F02B 63/044 290/1 A |

* cited by examiner

GAS FUEL FLOW CONTROL MECHANISM OF ELECTRONIC CONTROL SYSTEM

TECHNICAL FIELD

The present application relates to the technical field of engines, and in particular, to a gas fuel flow control mechanism of an electronic control system.

BACKGROUND

A gas-fueled engine has a specific gas supply line which basically includes a fuel gas delivery tube, an air delivery tube and a mixer, the fuel gas delivery tube and the air delivery tube are connected with the mixer, and the mixer is connected with the engine to form a gas mixture that enters the engine.

The existing mixer is provided with an air inlet and a fuel gas inlet, and a fuel gas and air are mixed at a valve plate of the mixer, and this mixing method is realized by diffusion of the air and the fuel gas inside the mixer. In order to control concentration of a resulting gas mixture, the requirement for gas flow regulation is relatively high. Generally, a motor fits an angle sensor to accurately adjust an angle of the valve plate. However, there is a gap between a motor shaft and a shaft hole of the angle sensor, resulting in unstable deflection angle due to shaking and a slight error, further causing failure to accurately control fuel gas flow.

SUMMARY

It is an object of the present application to provide a gas fuel flow control mechanism of an electronic control system in order to overcome the shortcomings and deficiencies of the prior art.

In order to achieve the above object, the present application provides the following technical solution: a gas fuel flow control mechanism of an electronic control system, includes a body, where a fuel gas inlet, an air inlet and a gas mixture outlet are provided on the body, the fuel gas inlet and air inlet are communicated with the gas mixture outlet through a main channel, a throttle with controllable opening is provided in the main channel near the gas mixture outlet, a valve plate with controllable opening is provided in the fuel gas inlet, the valve plate is rotatably connected with the body through a rotating shaft, and a motor and an angle sensor are respectively provided at two opposite ends of the rotating shaft, a shaft sleeve in fit with the rotating shaft is provided in the angle sensor, the shaft sleeve has a shaft hole into which the rotating shaft is inserted and mounted, and the shaft sleeve rotates with the rotating shaft, a torsion spring is fixed in the angle sensor, and a torsion end of the torsion spring is connected to the shaft sleeve, and the shaft sleeve clings to the rotating shaft under the action of the torsion spring to maintain a stationary fit state so that the shaft sleeve and the rotating shaft synchronously rotate.

As a preferred technical solution of the present application, the torsion spring is sheathed outside the shaft sleeve, the shaft sleeve is provided with a hole or groove into which the torsion end of the torsion spring is inserted, and the other end of the shaft sleeve is fixed inside the angle sensor.

As a preferred technical solution of the present application, the rotating shaft has a square shaft portion in fit with a shaft hole, the shaft hole is a circular hole, two positioning lugs located at both ends of the square shaft portion and arranged on two side surfaces of the square shaft portion in a staggered manner are provided in the circular hole, and the positioning lugs cling to the square shaft portion under the action of the torsion spring.

As a preferred technical solution of the present application, the rotating shaft has a square shaft portion in fit with a shaft hole, the shaft hole is a square hole, the square shaft portion is obliquely arranged in the square hole, and at least two end points of the square shaft portion abut against two side surfaces of the square hole under the action of the torsion spring.

As a preferred technical solution of the present application, an arc-shaped tube located in the main channel is also provided, and the arc-shaped tube is arranged coaxially with the main channel; an arc-shaped annular groove is formed on a circumferential wall of the arc-shaped tube; a gas inlet aperture penetrating inner and outer walls of the arc-shaped tube is provided at a lowest point of the annular groove; and the fuel gas inlet is communicated with the main channel through the gas inlet groove.

As a preferred technical solution of the present application, the arc-shaped tube includes a first arc segment and a second arc segment, the first arc segment is close to the air inlet, and an inner diameter of the first arc segment gradually increases along a direction from the gas inlet groove to the air inlet, and an inner diameter of the second arc segment gradually increases along a direction from the gas inlet groove to the gas mixture outlet.

As a preferred technical solution of the present application, a sealing ring is provided between the arc-shaped tube and the body, a positioning boss is provided on an outer wall of an end portion of the arc-shaped tube, and a positioning groove matching the positioning boss is provided on the body.

As a preferred technical solution of the present application, the throttle is rotatably connected with the body through a throttle shaft, a first limiting block is sheathed on the throttle shaft, two first fins are symmetrically provided on the first limiting block, a first limiting boss is provided on the body, and the first limiting boss is located on a rotation track of the first fins.

As a preferred technical solution of the present application, a second limiting block is sheathed on the rotating shaft, two second fins are symmetrically provided on the second limiting block, a second limiting boss is provided on the body, and the second limiting boss is located on a rotation track of the second fins.

In summary, the present application has the following beneficial effects.

Firstly, the torsion spring causes the shaft hole to cling to the rotating shaft to keep the two in a stationary fit state and avoid unstable deflection angle due to shaking; the square shaft portion at an inner end of the rotating shaft is inserted into the shaft hole; the shaft hole is a square hole or a circular hole; in either way, the square shaft portion can abut against an inner wall of the shaft hole; and the valve plate is opened by rotating towards a compression side of the torsion spring, so that a pretensioned state can be maintained, and the shaft hole always abuts against the square shaft portion, so that the angle sensor can accurately measure an angle of the rotating shaft and can accurately control fuel gas flow.

Secondly, the air enters the main channel through the air inlet, the fuel gas enters from the fuel gas inlet, and then enters the arc-shaped tube through the gas inlet groove of the arc-shaped tube to mix with the air therein, the throttle is configured to control the amount of the gas mixture from a mixing chamber to an engine, and the opening of the valve plate is designed to control the amount of the incoming fuel gas; since the gas inlet aperture is a square aperture, the fuel gas can enter the arc-shaped tube in a sheet form along the gas inlet aperture; and under the action of the arc-shaped tube, the air has a fast flow rate, so that the fuel gas and the air can be rapidly mixed, which improves the mixing efficiency and ensures acceleration performance of the engine.

DETAILED DESCRIPTION OF THE EMBODIMENTS

In order to make the technical means, creative features, objectives and effects achieved by the present application easy to understand, the present application will be further illustrated below in conjunction with specific embodiments and the accompanying drawings. However, the following embodiments are only preferred embodiments of the present application and are not exhaustive. All other embodiments obtained by those skilled in the art based on the embodiments herein without creative efforts fall within the protection scope of the present application.

Specific embodiments of the present application will now be described with reference to the accompanying drawings.

Figure 1:
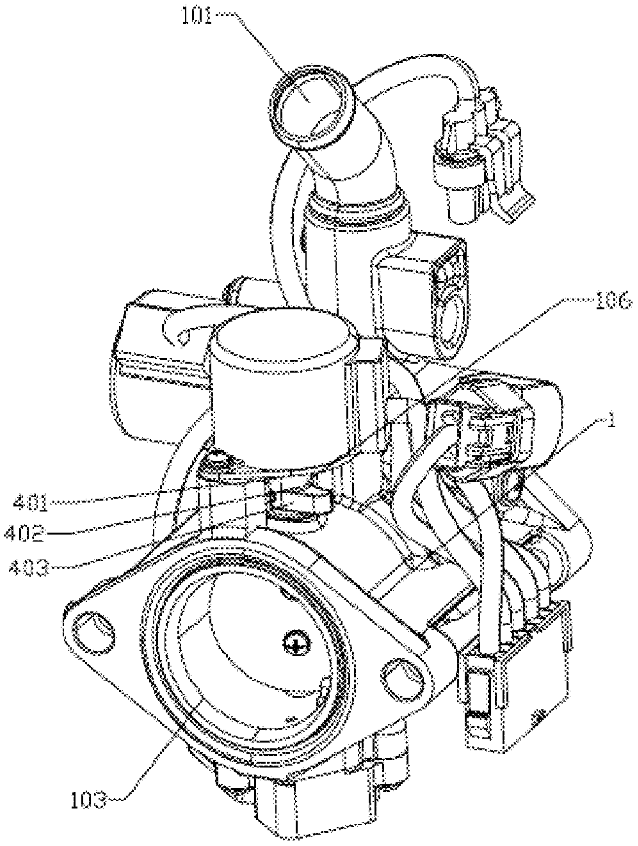
FIG. 1 is a structural schematic diagram of a gas fuel flow control mechanism of an electronic control system of the present application.
Figure 2:
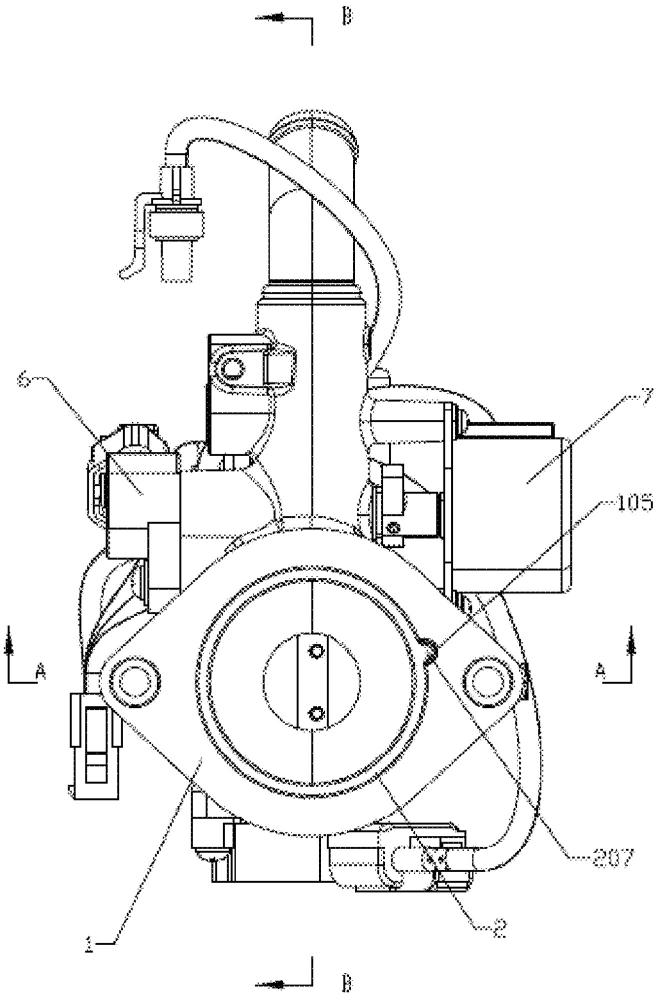
FIG. 2 is a structural schematic diagram of a gas fuel flow control mechanism of an electronic control system of the present application from another perspective.
Figure 3:
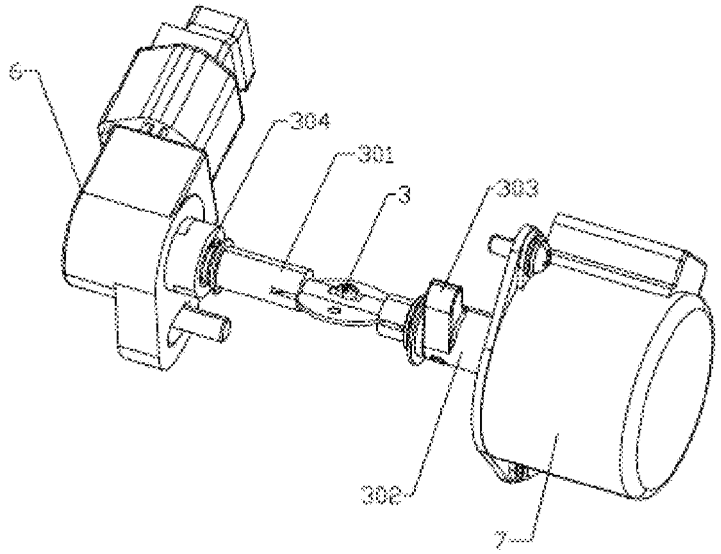
FIG. 3 is a structural schematic diagram of a valve plate in a gas fuel flow control mechanism of an electronic control system of the present application.
Figure 4:
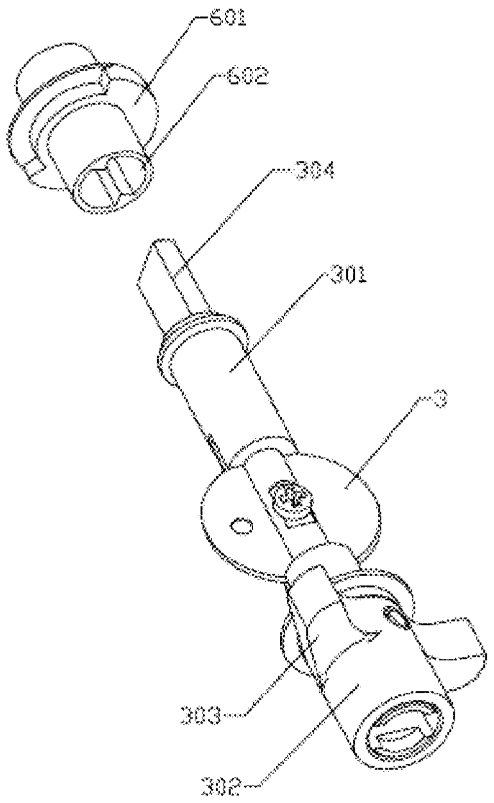
FIG. 4 is a structural schematic diagram of a valve plate in a gas fuel flow control mechanism of an electronic control system of the present application.
Figure 5:
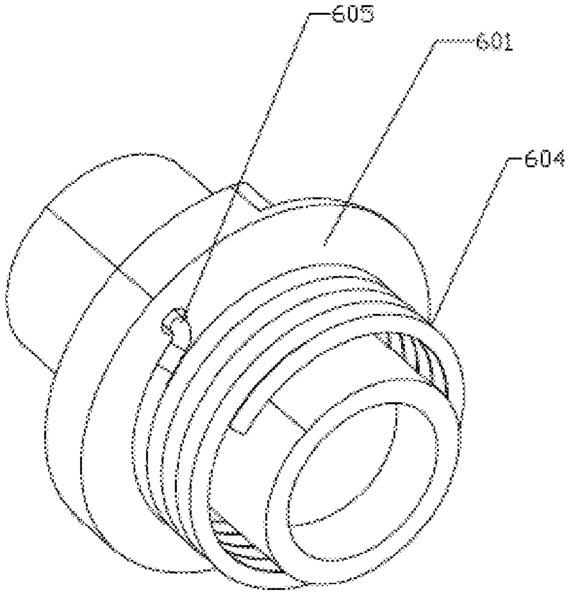
FIG. 5 is a structural schematic diagram of a shaft sleeve and torsion spring in a gas fuel flow control mechanism of an electronic control system of the present application.
Figure 6:
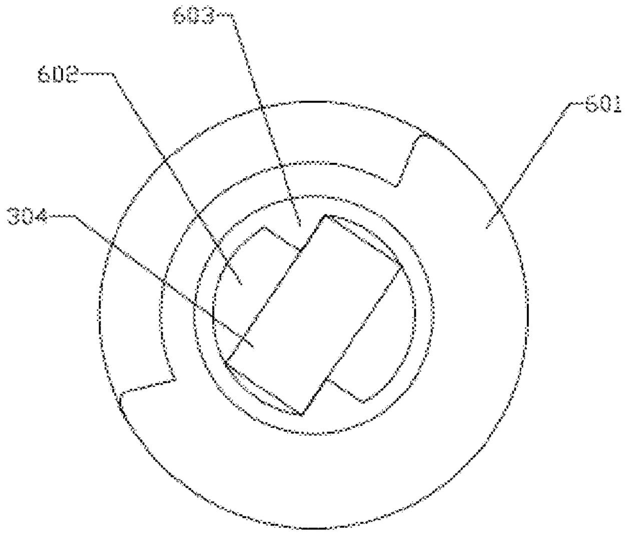
FIG. 6 is a structural schematic diagram of a shaft hole in the form of a circular hole in a gas fuel flow control mechanism of an electronic control system of the present application.
Figure 7:
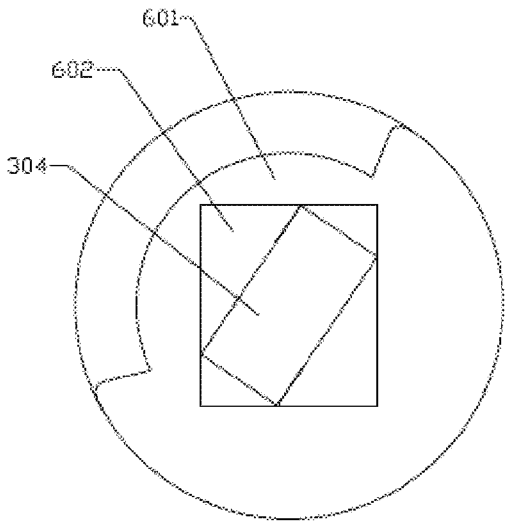
FIG. 7 is a structural schematic diagram of a shaft hole in the form of a square hole in a gas fuel flow control mechanism of an electronic control system of the present application.
Figure 8:
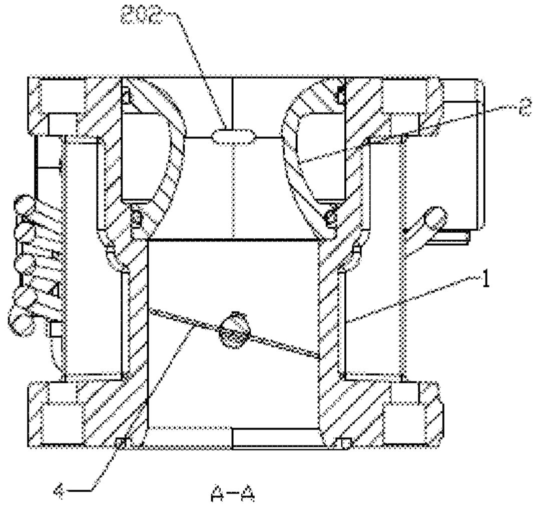
FIG. 8 is a sectional view of A-A in FIG. 2.
Figure 9:
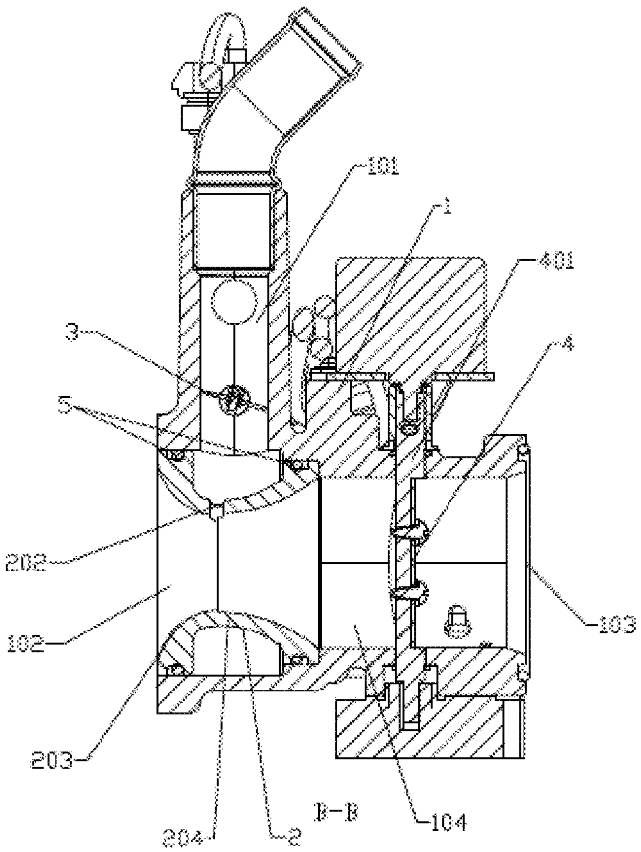
FIG. 9 is a sectional view of B-B in FIG. 2.
Figure 10:
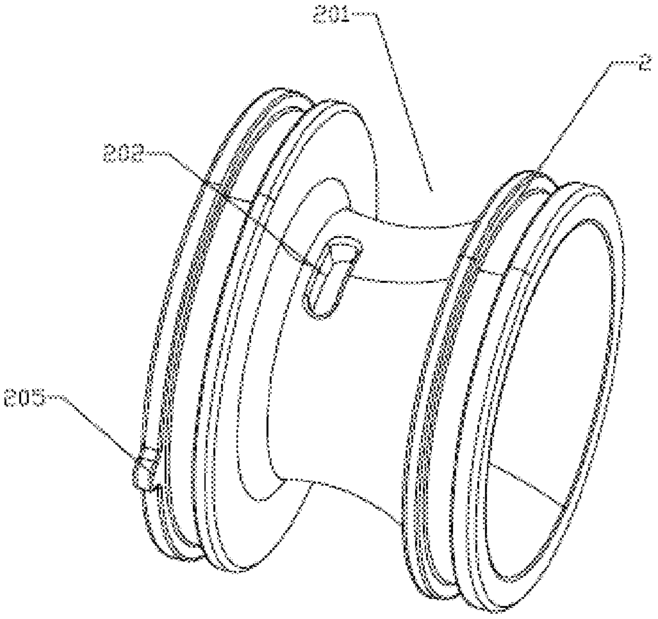
FIG. 10 is a structural schematic diagram of an arc-shaped tube in a gas fuel flow control mechanism of an electronic control system of the present application.
Figure 11:
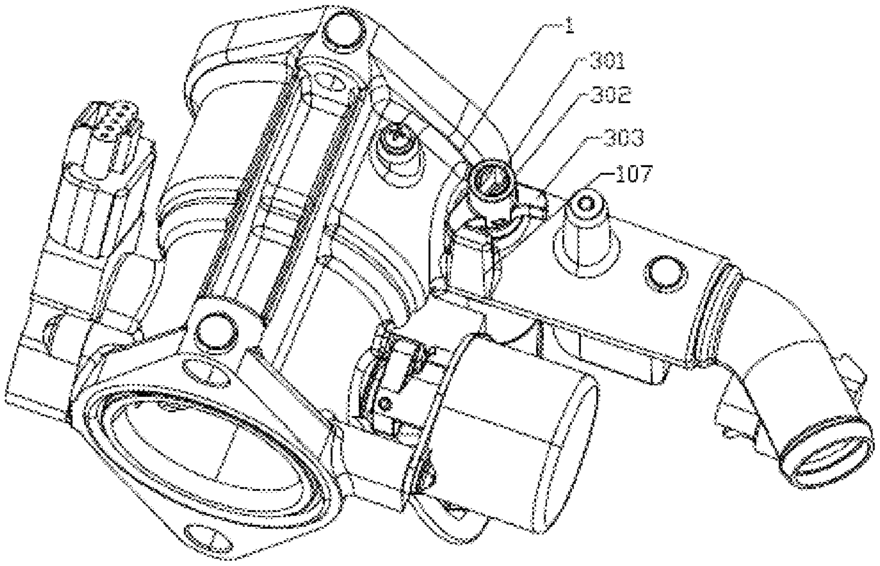
FIG. 11 is a structural schematic diagram of a gas fuel flow control mechanism of an electronic control system of the present application.

As shown in FIGS. 1-11, a gas fuel flow control mechanism of an electronic control system, includes a body 1, where a fuel gas inlet 101, an air inlet 102 and a gas mixture outlet 103 are provided on the body 1, the fuel gas inlet 101 and air inlet 102 are communicated with the gas mixture outlet 103 through a main channel 104, a throttle 4 with controllable opening is provided in the main channel 104 near the gas mixture outlet 103, a valve plate 3 with controllable opening is provided in the fuel gas inlet 101, the valve plate 3 is rotatably connected with the body 1 through a rotating shaft 301, and a motor 7 and an angle sensor 6 are respectively provided at two opposite ends of the rotating shaft 301, a shaft sleeve 601 in fit with the rotating shaft 301 is provided in the angle sensor 6, the shaft sleeve 601 has a shaft hole 602 into which the rotating shaft 301 is inserted and mounted, and the shaft sleeve 601 rotates with the rotating shaft 301, a torsion spring 604 is fixed in the angle sensor 6, and a torsion end 605 of the torsion spring 604 is connected to the shaft sleeve 601, and the shaft sleeve 601 clings to the rotating shaft 301 under the action of the torsion spring 604 to maintain a stationary fit state so that the shaft sleeve and the rotating shaft synchronously rotate. In the present embodiment, the angle sensor 6 is commercially available, and its working principle is the prior art, so it will not be described in detail.

The torsion spring 604 causes the shaft hole 602 to cling to the rotating shaft 301 to keep the two in a stationary fit state and avoid unstable deflection angle due to shaking; the square shaft portion 304 at an inner end of the rotating shaft 301 is inserted into the shaft hole 602; the shaft hole 602 is a square hole or a circular hole; in either way, the square shaft portion 304 can abut against an inner wall of the shaft hole 602; and the valve plate 3 is opened by rotating towards a compression side of the torsion spring 604, so that a pretensioned state can be maintained, and the shaft hole 602 always abuts against the square shaft portion 304, so that the angle sensor 6 can accurately measure an angle of the rotating shaft 301 and can accurately control fuel gas flow.

The torsion spring 604 is sheathed outside the shaft sleeve 601, the shaft sleeve 601 is provided with a hole or groove into which the torsion end 605 of the torsion spring 604 is inserted, and the other end of the shaft sleeve 601 (not shown in the figures) is fixed to an inner wall of the angle sensor 6.

The rotating shaft 301 has a square shaft portion 304 in fit with a shaft hole 602, the shaft hole 602 is a circular hole, two positioning lugs 603 located at both ends of the square shaft portion 304 and arranged on two side surfaces of the square shaft portion 304 in a staggered manner are provided in the circular hole, and the positioning lugs 603 cling to the square shaft portion 304 under the action of the torsion spring 604; when the valve plate 3 is adjusted from a closed state to an open state, the rotating shaft 301 rotates to one side of the positioning lugs 603, at this time, the torsion spring 604 is gradually compressed, and the rotation of the shaft sleeve 601 needs to overcome a torsional force of the torsion spring 604; therefore, the positioning lugs 603 of the shaft sleeve 601 always abut against the square shaft portion 304, the rotating shaft 301 and the shaft sleeve 601 are in a coaxial state or close to a coaxial state, and a small error does not affect the two, and it is only necessary to ensure that there is no relative movement between the two due to a gap; a relevant parameter can be set in a controller in advance; and if there is a slight error in non-coaxial setting, the rotation angle detected by the angle sensor 6 will have a slight error compared with the actual rotation angle, and a corresponding parameter can be set.

The rotating shaft 301 has a square shaft portion 304 in fit with a shaft hole 602, the shaft hole 602 is a square hole, the square shaft portion 304 is obliquely arranged in the square hole, and at least two end points of the square shaft portion 304 abut against two side surfaces of the square hole under the action of the torsion spring 604.

In the present embodiment, the arc-shaped tube 2 is similar to a venturi tube; the air enters the main channel 104 through the air inlet 102, the fuel gas enters from the fuel gas inlet 101, and then enters the arc-shaped tube 2 through the gas inlet groove 202 of the arc-shaped tube 2 to mix with the air therein, the throttle 4 is configured to control the amount of the gas mixture from a mixing chamber to an engine, and the opening of the valve plate 3 is designed to control the amount of the incoming fuel gas; since the gas inlet aperture 202 is a square aperture, the fuel gas can enter the arc-shaped tube 2 in a sheet form along the gas inlet aperture 202; and under the action of the arc-shaped tube 2, the air has a fast flow rate, so that the fuel gas and the air can be rapidly mixed, and concentration of a combustible gas can be controlled stably, thus ensuring acceleration performance of the engine.

In the present embodiment, only one gas inlet groove 202 is provided on the arc-shaped tube 2, which can shorten the processing time of the arc-shaped tube 2.

The arc-shaped tube 2 includes a first arc segment 203 and a second arc segment 204, the first arc segment 203 is close to the air inlet 102, and an inner diameter of the first arc segment 203 gradually increases along a direction from the gas inlet groove 202 to the air inlet 102, and an inner diameter of the second arc segment 204 gradually increases along a direction from the gas inlet groove 202 to the gas mixture outlet 103. The first arc segment 203 and the second arc segment 204 are arranged to have different inner diameter changes to further increase their cross section changes, thus forming swirling flows to ensure sufficient and uniform mixing of the fuel gas and the air, and improve the mixing quality.

In the present embodiment, a sealing ring 5 is provided between the arc-shaped tube 2 and the body 1 to ensure the sealing performance between the arc-shaped tube 2 and the body 1. The arc-shaped tube 2 is mounted on the body 1, and by arranging a positioning boss 205 on an outer wall of an end portion of the arc-shaped tube 2, the body 1 is provided with a positioning groove 105 matching the positioning boss 205 to ensure accuracy of an assembly position.

In order to control a limit position of the opening of the throttle 4 so as to better control the amount of the incoming gas mixture, the throttle 4 is rotatably connected with the body 1 by a throttle shaft 401, a first limiting block 402 is sheathed on the throttle shaft 401, two first fins 403 are symmetrically provided on the first limiting block 402, a first limiting boss 106 is provided on the body 1, the first limiting boss 106 is located on a rotation track of the first fins 403, and when the throttle shaft 401 rotates to drive the throttle 4 to rotate, the two first fins 403 respectively abut against the first limiting boss 106 to limit a maximum opening position and a minimum opening position of the throttle 4. It should be noted that in the present embodiments, both ends of the throttle shaft 401 are also provided with the angle sensor 6 and the motor 7 for automatic opening and closing, and the shaft sleeve 601 in the angle sensor 6 fits the throttle shaft 401 in the same manner as the structure at the valve plate 3 described above. Likewise, the valve plate 3 is rotatably connected with the body 1 by the rotating shaft 301, a second limiting block 302 is sheathed on the rotating shaft 301, two second fins 303 are symmetrically provided on the second limiting block 302, a second limiting boss 107 is provided on the body 1, the second limiting boss 107 is located on a rotation track of the second fins 303, and maximum opening and minimum opening of the valve plate 3 are limited by the second limiting boss 107 and the two second fins 303.

The basic principles, main features and advantages of the present application have been shown and described above. It should be understood by those skilled in the art that the present application is not limited by the above-described embodiments, the above-described embodiments and descriptions herein are merely preferred embodiments of the present application and are not intended to limit the present application, the present application will have various changes and improvements without departing from the spirit and scope of the present application, and these changes and improvements all fall within the scope of the present application, and the claimed scope of the present application is defined by the appended claims and their equivalents.

What is claimed is:

1. A gas fuel flow control mechanism of an electronic control system, comprising a body, a fuel gas inlet, an air inlet and a gas mixture outlet being provided on the body; wherein the fuel gas inlet and air inlet are communicated with the gas mixture outlet through a main channel, a throttle with controllable opening is provided in the main channel near the gas mixture outlet, a valve plate with controllable opening is provided in the fuel gas inlet, the valve plate is rotatably connected with the body through a rotating shaft, and a motor and an angle sensor are respectively provided at two opposite ends of the rotating shaft; and a shaft sleeve in fit with the rotating shaft is provided in the angle sensor, the shaft sleeve has a shaft hole into which the rotating shaft is inserted and mounted, and the shaft sleeve rotates with the rotating shaft, a torsion spring is fixed in the angle sensor, a torsion end of the torsion spring is connected to the shaft sleeve, and the shaft sleeve clings to the rotating shaft under the action of the torsion spring to maintain a stationary fit state so that the shaft sleeve and the rotating shaft synchronously rotate;

an arc-shaped tube located in the main channel is also provided, and the arc-shaped tube is arranged coaxially with the main channel; an arc-shaped annular groove is formed on a circumferential wall of the arc-shaped tube; a gas inlet aperture penetrating inner and outer walls of the arc-shaped tube is provided at a lowest point of the annular groove; and the fuel gas inlet is communicated with the main channel through the gas inlet aperture;

a sealing ring is provided between the arc-shaped tube and the body, a positioning boss is provided on an outer wall of an end portion of the arc-shaped tube, and a positioning groove matching the positioning boss is provided on the body.

2. The gas fuel flow control mechanism of the electronic control system according to claim 1, wherein, the torsion spring is sheathed outside the shaft sleeve, the shaft sleeve is provided with a hole or groove into which the torsion end of the torsion spring is inserted, and the other end of the shaft sleeve is fixed inside the angle sensor.

3. The gas fuel flow control mechanism of the electronic control system according to claim 1, wherein, the rotating shaft has a square shaft portion in fit with a shaft hole, the shaft hole is a circular hole, two positioning lugs located at both ends of the square shaft portion and arranged on two side surfaces of the square shaft portion in a staggered manner are provided in the circular hole, and the positioning lugs cling to the square shaft portion under the action of the torsion spring.

4. The gas fuel flow control mechanism of the electronic control system according to claim 1, wherein, the rotating shaft has a square shaft portion in fit with a shaft hole, the shaft hole is a square hole, the square shaft portion is obliquely arranged in the square hole, and at least two end points of the square shaft portion abut against two side surfaces of the square hole under the action of the torsion spring.

5. The gas fuel flow control mechanism of the electronic control system according to claim 1, wherein, the arc-shaped tube comprises a first arc segment and a second arc segment, the first arc segment is close to the air inlet, and an inner diameter of the first arc segment gradually increases along a direction from the gas inlet aperture to the air inlet, and an inner diameter of the second arc segment gradually increases along a direction from the gas inlet aperture to the gas mixture outlet.

6. The gas fuel flow control mechanism of the electronic control system according to claim 1, wherein, the throttle is rotatably connected with the body through a throttle shaft, a first limiting block is sheathed on the throttle shaft, two first fins are symmetrically provided on the first limiting block, a first limiting boss is provided on the body, and the first limiting boss is located on a rotation track of the first fins.

7. The gas fuel flow control mechanism of the electronic control system according to claim 1, wherein, a second limiting block is sheathed on the rotating shaft, two second fins are symmetrically provided on the second limiting block, a second limiting boss is provided on the body, and the second limiting boss is located on a rotation track of the second fins.

* * * * *